United States Patent
Wallis

(10) Patent No.: US 9,526,005 B2
(45) Date of Patent: Dec. 20, 2016

(54) GSM A3/A8 AUTHENTICATION IN AN IMS NETWORK

(71) Applicant: Mavenir Systems, Inc., Richardson, TX (US)

(72) Inventor: Michael Brett Wallis, McKinney, TX (US)

(73) Assignee: Mitel Mobility Inc., Richardson, TX (US)

( * ) Notice: Subject to any disclaimer, the term of this patent is extended or adjusted under 35 U.S.C. 154(b) by 0 days.

(21) Appl. No.: 14/683,483

(22) Filed: Apr. 10, 2015

(65) Prior Publication Data

US 2015/0304846 A1  Oct. 22, 2015

Related U.S. Application Data

(60) Provisional application No. 61/980,741, filed on Apr. 17, 2014.

(51) Int. Cl.
| | |
|---|---|
| *H04M 3/16* | (2006.01) |
| *H04W 12/06* | (2009.01) |
| *H04L 29/06* | (2006.01) |
| *H04W 12/04* | (2009.01) |

(52) U.S. Cl.
CPC .......... *H04W 12/06* (2013.01); *H04L 63/0853* (2013.01); *H04L 63/0892* (2013.01); *H04L 65/1016* (2013.01); *H04W 12/04* (2013.01)

(58) Field of Classification Search
CPC ............. H04L 63/0853; H04L 63/0892; H04L 65/1016; H04W 12/04; H04W 12/06
USPC ............................ 455/410–411, 412.1–414.2, 418–421,455/434, 448, 67.11–67.11, 558, 556.2, 550.1; 370/328–338, 401; 380/277, 248, 258; 726/3, 9, 17, 21, 14; 379/211.05, 433.09
See application file for complete search history.

(56) References Cited

U.S. PATENT DOCUMENTS

| | | | |
|---|---|---|---|
| 6,671,507 B1 | 12/2003 | Vinck | |
| 2003/0051041 A1* | 3/2003 | Kalavade | G06Q 20/14 709/229 |
| 2005/0246282 A1* | 11/2005 | Naslund | H04L 63/0428 705/52 |
| 2006/0205388 A1* | 9/2006 | Semple | H04L 63/0853 455/411 |
| 2006/0288407 A1* | 12/2006 | Naslund | H04L 9/0844 726/9 |
| 2008/0064369 A1* | 3/2008 | Xie | H04L 63/08 455/411 |

(Continued)

FOREIGN PATENT DOCUMENTS

| | | |
|---|---|---|
| WO | WO 2006/085170 A1 | 8/2006 |
| WO | WO 2008/122650 A2 | 10/2008 |

*Primary Examiner* — Babar Sarwar

(57) ABSTRACT

A telecommunication network comprises an ICS GW configured to receive an access request from a UE; an HSS FE configured to retrieve A3/A8 authentication vectors including an A3/A8 authentication response from an HLR, and further configured to encode the A3/A8 authentication vectors as AKA authentication vectors and send the AKA authentication parameters to an S-CSCF; the ICS GW configured to receive an authentication challenge from the S-CSCF with encoded A3/A8 authentication vectors, and further configured to detect the A3/A8 authentication vectors and issue an A3/A8 authentication challenge to the UE; and the ICS GW configured to receive an A3/A8 authentication response from the UE, and further to encode the A3/A8 authentication response into an AKA authentication response and sending it to the S-CSCF for comparison.

12 Claims, 4 Drawing Sheets

(56) References Cited

U.S. PATENT DOCUMENTS

| | | | |
|---|---|---|---|
| 2008/0155658 A1* | 6/2008 | Leinonen | H04L 63/08 |
| | | | 726/4 |
| 2008/0178273 A1 | 7/2008 | Weber | |
| 2009/0086742 A1* | 4/2009 | Ghai | H04W 36/14 |
| | | | 370/401 |
| 2010/0293593 A1* | 11/2010 | Lindholm | H04L 63/102 |
| | | | 726/1 |
| 2011/0022843 A1* | 1/2011 | Blom | H04L 63/0428 |
| | | | 713/169 |
| 2011/0296494 A1* | 12/2011 | Muller | H04L 63/0853 |
| | | | 726/3 |
| 2012/0264402 A1* | 10/2012 | Zhang | H04L 63/0815 |
| | | | 455/411 |
| 2013/0343538 A1 | 12/2013 | Mizikovsky et al. | |
| 2014/0196127 A1* | 7/2014 | Smeets | H04L 63/0815 |
| | | | 726/5 |
| 2015/0201315 A1* | 7/2015 | Kurokawa | H04M 7/126 |
| | | | 455/414.1 |

* cited by examiner

GSM A3/A8 AUTHENTICATION IN AN IMS NETWORK

RELATED APPLICATION

This patent applications claims the benefit of U.S. Provisional Patent Application No. 61/980,741, filed on Apr. 17, 2014.

FIELD

The present disclosure relates to a system and method for GSM (Global System for Mobile Communications) A3/A8 authentication in an IMS (IP Multimedia Subsystem) network.

BACKGROUND

"Authentication" is the means by which a cellular network can validate the identity of a subscriber, or more accurately, of a Subscriber Identity Module (SIM) that is inserted into a mobile device. The Authentication Center (AuC) (which is typically part of or co-located with the Home Location Register (HLR) or Home Subscriber Server (HSS)) is configured to authenticate each SIM card that attempts to connect to the GSM core network. Once authentication is successful, the HLR is allowed to manage the SIM and subscriber services. The SIM and AuC have a shared secret that is unique to a given subscriber/SIM. The shared secret is used as an input to an authentication algorithm, either A3 or A8, that are executed at both the mobile device/SIM and the AuC. If the results from the mobile device and AuC match, authentication is deemed successful.

Successful authentication results in the establishment of a security association between the SIM and the network. This security association is basically a set of data, such as an integrity key and a ciphering key, which are used to provide security services during the life of that security association.

The IMS (IP Multimedia Subsystem) defines a generic architecture for offering multimedia services such as Voice over IP (VoIP). The IMS core network includes the Call Session Control Function (CSCF) and the Home Subscriber Server (HSS). The CSCF facilitates session setup and tear-down using SIP (Session Initiation Protocol). The HSS plays the role of a location server in IMS and also serves as a repository for subscriber data. The CSCF is divided into three logical entities: Proxy CSCF (P-CSCF), Interrogating CSCF (I-CSCF), and Serving CSCF (S-CSCF). The P-CSCF is responsible for routing incoming SIP messages to the IMS registrar server and for facilitating policy control. The I-CSCF acts as an inbound SIP proxy server in the IMS. The S-CSCF is the heart of the IMS core network, and facilitates the routing path for mobile originated or terminated session requests and is the most processing intensive node of the IMS core network.

Before a user can have access to IMS services, an IMS-capable User Equipment (UE) equipped with a Universal Subscriber Identity Module (USIM) or an IP Multimedia Subscriber Identity Modules (ISIM) must authenticate with the S-CSCF. However, for older SIM-based UEs, access to IMS is not possible as the IMS specifications do not support the SIM-based A3/A8 authentication protocol, but rather define a newer security protocol called AKA or Authentication and Key Agreement.

DETAILED DESCRIPTION

Figure 1:
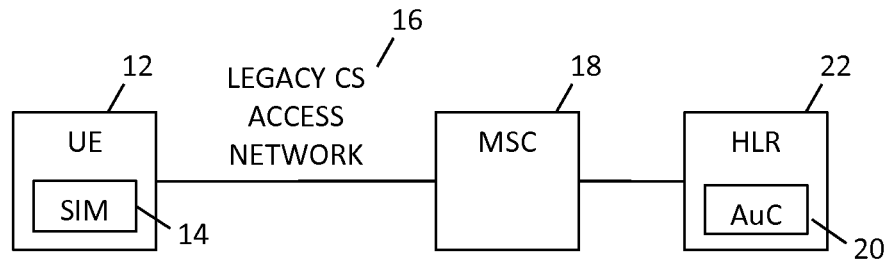
FIG. 1 is a simplified block diagram of an exemplary embodiment of GSM A3/A8 authentication in legacy CS networks according to the present disclosure.

FIG. 1 is a simplified block diagram of an exemplary embodiment of GSM A3/A8 authentication in legacy CS (circuit switched) networks according to the present disclosure. A UE (User Equipment) 12 with a SIM (Subscriber Identity Module) 14 accesses a legacy CS network 16. The MSC (Mobile Switching Center) 18 receives A3/A8 authentication vectors from the AuC (Authentication Center) 20 that is typically part of or co-located with the HLR (Home Location Register) 22. The MSC 18 then issues an A3/A8 authentication challenge to the UE 12. The UE 12 runs the A3/A8 authentication algorithm and sends its response to the MSC 18. The MSC 18 then checks to determine whether the UE's response matches the HLR's response. If the results from the UE 12 and the HLR 22 match, then authentication is successful and the UE 12 may access services provided by the network.

Figure 2:
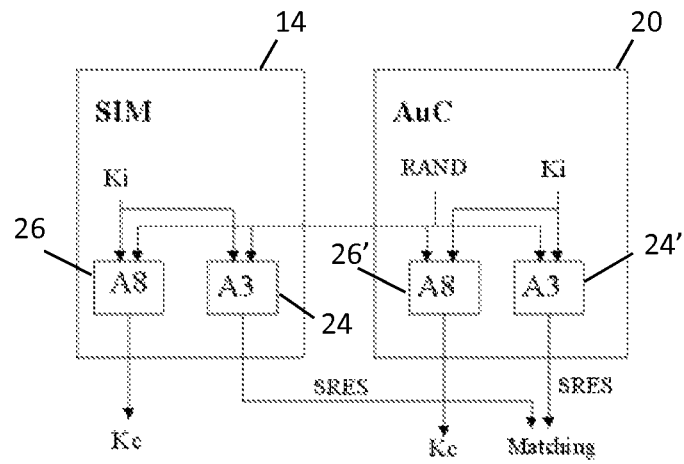
FIG. 2 is a simplified block diagram of an exemplary embodiment of A3/A8 authentication.

FIG. 2 is a simplified block diagram of an exemplary embodiment of A3/A8 authentication method or function. As described above, older GSM (Global System for Mobile Communications) SIMs (Subscriber Identity Modules) in mobile telephones (User Equipment or UE) use an authentication algorithm called A3 (authentication) 24 and A8 (confidentiality key creation) 26. The A3/A8 algorithm receives as input a 128-bit subscriber secret, Ki, and a random number, RAND (128-bit). The subscriber secret, Ki, is a secret key that is associated with the IMSI (International Mobile Subscriber Identity) of the subscriber. The AuC is configured to look up the Ki using the IMSI, and the Ki is also stored on the SIM card in the UE. The A3 algorithm generates a Signed Response, SRES (4 bytes), and the A8 algorithm generates a Confidentiality Key or Ciphering Key, Kc (8 bytes). The Kc will be used in an algorithm called A5 to encrypt and decrypt data that will be transmitted on the Um interface with the UE. Therefore, the AuC also performs the same A3/A8 authentication function 24' and 26'. If the SRES calculated by the SIM 14 matches the SRES calculated by the AuC 20, the authentication is successful and the confidentiality key, Kc, can then be used for signaling between the mobile device (UE 12) and the GSM network.

With the introduction of Universal Mobile Telecommunications System (UMTS), UEs are equipped with USIMs (Universal Subscriber Identity Module) that use a newer and stronger authentication algorithm called AKA (Authentication and Key Agreement). Both A3/A8 and AKA authentication algorithms are supported in legacy circuit switched (CS) networks today.

Figure 3:
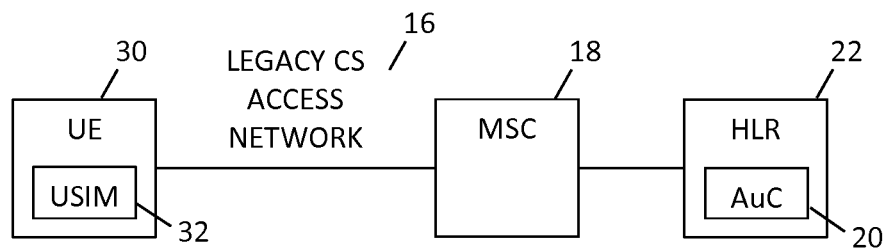
FIG. 3 is a simplified block diagram of an exemplary embodiment of UMTS AKA Authentication in Legacy CS Networks according to the present disclosure.

In FIG. 3, a UE 30 equipped with a USIM (Universal Subscriber Identity Module) 32 accesses the legacy CS network 16. The MSC 18 receives AKA authentication vectors from the HLR 22. The MSC 18 then issues an AKA authentication challenge to the UE 30. The UE 30 runs the AKA authentication algorithm and sends its response to the MSC 18. The MSC 18 then checks to determine whether the UE's response matches the HLR's response.

Figure 4:
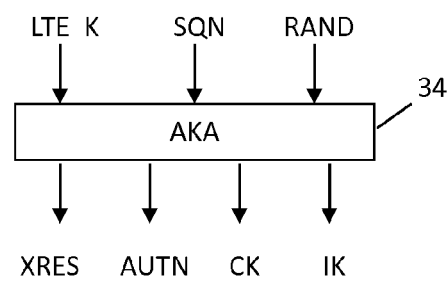
FIG. 4 is a simplified block diagram of an exemplary embodiment of AKA authentication.

As shown in FIG. 4, the AKA algorithm 34 receives, as input, the subscriber secret K, a sequence number (SQN), and a random number RAND. Its outputs are an Expected Response XRES (8 bytes), an Authentication Token AUTN (16 bytes), a Confidentiality Key CK (16 bytes), and an Integrity Key IK (16 bytes). If the XRES calculated by the USIM 32 matches the XRES calculated by the AuC 20, the authentication is successful and both the confidentiality key, CK, and integrity key, IK, are then be used in signaling between the mobile device and the network.

Figure 5:
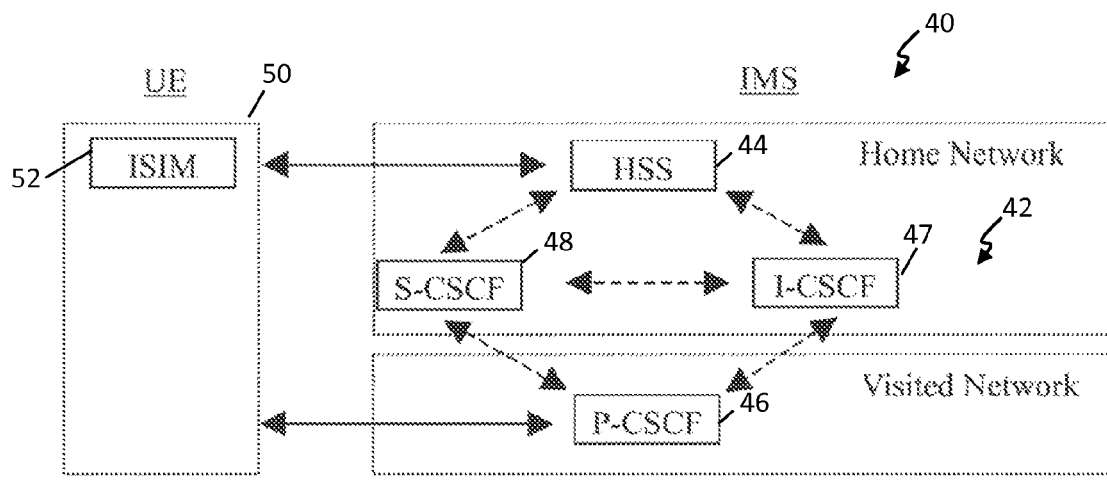
FIG. 5 is a simplified block diagram of an exemplary embodiment of the IMS core.

FIG. 5 is a simplified block diagram of network nodes of an IMS (IP Multimedia Subsystem) core network 40. The IMS 40 is a standardized Next Generation Network (NGN) architecture defined by the European Telecommunication Standards Institute (ETSI) and the 3rd Generation Partnership Project (3GPP) to provide Internet media services capability. As with the Internet, NGN is built around the Internet Protocol (IP) and its goal is to create a unified system that offers services like video, voice and data by encapsulating them into packets. The NGN architecture can incorporate a variety of wireless and wireline technological alternatives for users to access the global telecommunication network. IMS is a set of standards that defines a generic architecture for offering Voice over IP (VoIP) and multimedia services. The IMS core network 40 includes the Call Session Control Function (CSCF) 42 and the Home Subscriber Server (HSS) 44. The CSCF 42 node facilitates session setup and teardown using SIP (Session Initiation Protocol). The HSS 44 plays the role of a location server in the IMS and also serves as a single point of service for IMS subscribers and their services.

As shown in FIG. 5, the CSCF functionality 42 is divided into three logical entities: Proxy CSCF (P-CSCF) 46, Interrogating CSCF (I-CSCF) 47, and Serving CSCF (S-CSCF) 48. The P-CSCF 46 is responsible for routing incoming SIP messages to the IMS registrar server and for facilitating policy control. The I-CSCF 47 acts as an inbound SIP proxy server in the IMS network. The S-CSCF 48 is the heart of the IMS core network 40, and facilitates the routing path for mobile originated or terminated session requests and is the most processing intensive node of the IMS core network. The S-CSCF 48 acts as the registrar sending an authentication challenge to a UE 50 with authentication vectors supplied by the HSS 44. With the introduction of IMS, UEs incorporate an ISIMs (IP Multimedia Subscriber Identity Modules) 52. Once the UE 50 has successfully completed the authentication process, the S-CSCF 48 completes the registration and notifies the HSS 44. Because the IMS is specified to provide support for AKA authentication, there is no capability to perform the older A3/A8 authentication within the IMS network.

Figure 6:
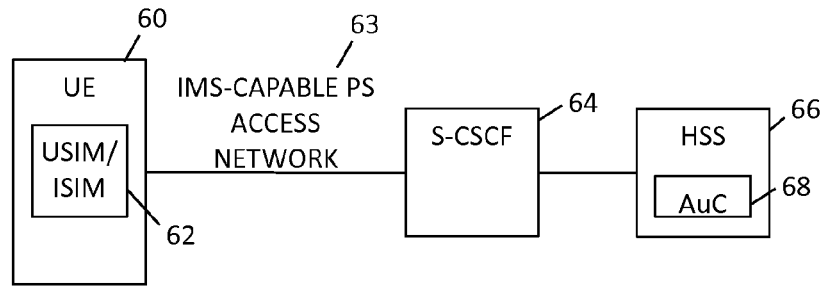
FIG. 6 is a simplified block diagram of an exemplary embodiment of AKA Authentication in IMS Networks.

In FIG. 6, an IMS-capable UE 60 equipped with USIM or ISIM 62 accesses an IMS-capable PS (Packet Switched) network 63. The S-CSCF 64 of the IMS network receives AKA authentication vectors computed by the AuC 68 from the HSS 66. The S-CSCF 64 then issues an AKA authentication challenge to the UE 60. The UE 60 runs the AKA authentication algorithm and sends its response to the S-CSCF 64. The S-CSCF 64 then checks that the UE's response matches the response from the HSS 66. If the responses match, then authentication is successful.

Figure 7:
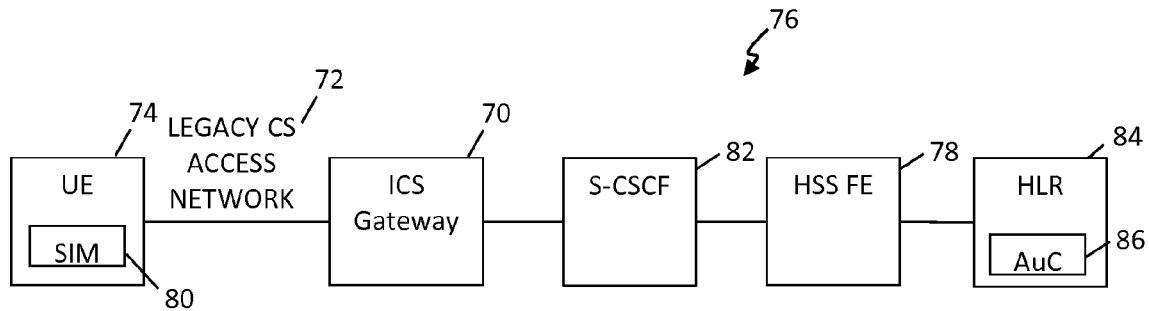
FIG. 7 is a simplified block diagram of an exemplary embodiment of GSM A3/A8 Authentication in an IMS network according to the present disclosure.
Figure 9:
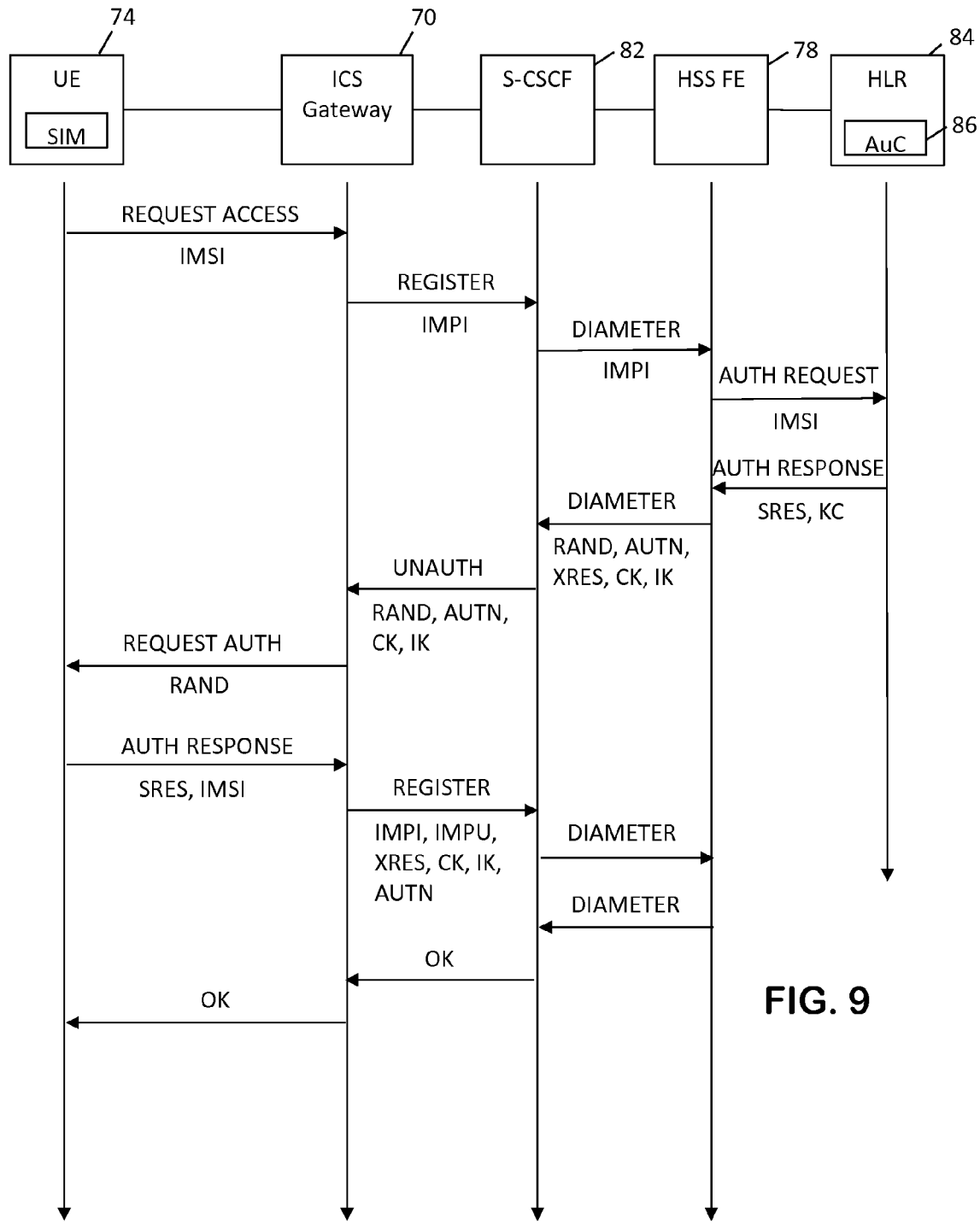
FIG. 9 is a simplified data flow diagram of an exemplary embodiment of GSM A3/A8 Authentication in an IMS network according to the present disclosure.

FIG. 7 is a simplified block diagram of an exemplary embodiment of GSM A3/A8 Authentication in an IMS network according to the present disclosure. Referring to FIG. 7 and to the data flow diagram in FIG. 9, an IMS Centralized Services Gateway (ICS GW) 70 is a network node that connects legacy GSM/UMTS access networks 72 (and thus legacy GSM/UMTS mobile devices or UEs 74) with an IMS core network 76. A network node, HSS FE (Home Subscriber Server Front End) 78, appears as an HSS to the IMS core network 76. A UE 74 equipped with a SIM 80 attempts to access the network. The ICS GW 70 receives the UE's request and is configured to make this UE 74 appear as an AKA-capable IMS UE to the IMS core network 76. The ICS GW 70 sends a register message to the S-CSCF 82 with an IMPI (IP Multimedia Private Identity) associated with the IMSI (International Mobile Subscriber Identity) received from the UE 74. The S-CSCF 82 then requests AKA authentication vectors from the HSS (HSS FE) 78. The HSS FE 78 retrieves authentication vectors from the HLR 84/AuC 86, and detects that it has received A3/A8 vectors (SRES and KC). The HSS FE 78 then encodes or embeds the A3/A8 authentication vector information (SRES and KC) into the parameters defined for AKA (XRES, CK, IK, AUTN) and sends the disguised information to the S-CSCF 82 along with the Random number, RAND. The S-CSCF 82 does not detect the disguised A3/A8 vector information and issues the authentication challenge towards the UE (via the ICS GW 70). The ICS GW 70 detects that what is being passed in the AKA parameters is actually A3/A8 vector information and instead issues an A3/A8 authentication challenge containing RAND to the UE 74. The UE 74 runs the A3/A8 authentication algorithm and sends its response (SRES) to the ICS GW 70. The ICS GW 70 encodes or embeds the A3/A8 response (SRES) into the parameters defined for AKA. Again, the S-CSCF 82 does not detect the A3/A8 response, and checks that the UE's response matches the HSS's response. In this way, the IMS core network is able to perform GSM A3/A8 authentication for a SIM-based UE 74.

In an alternate embodiment, an actual HSS may function in the place of the HSS FE 78, for example. As a further alternative, a Visiting Subscriber Server (VSS) may implement the functionalities of the HSS FE 78.

Accordingly, the present disclosure provides a way to interface with a UE having an older GSM SIM so that there is support for A3/A8 authentication within an IMS core network that by definition does not support this older authentication algorithm. In the method disclosed herein, the IMS core network thinks that AKA authentication is being used for authentication when in fact GSM A3/A8 is being used. In this way, no change or adaptation in the IMS core network is required to interface with older SIM-based UEs.

Figure 8:
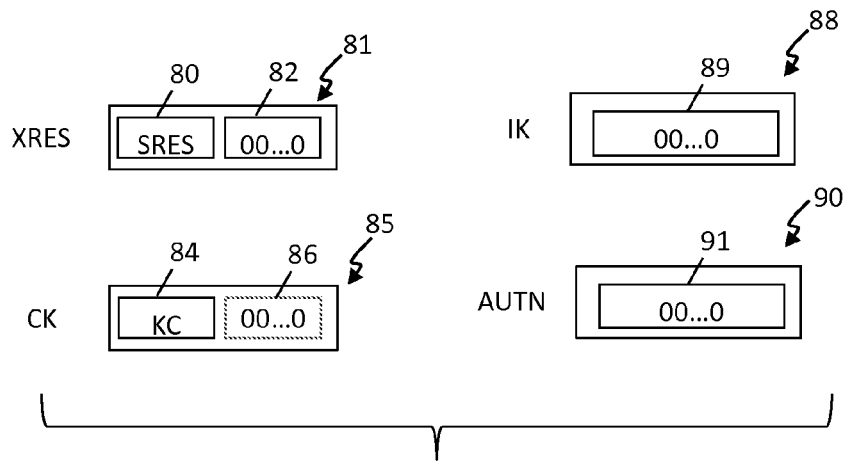
FIG. 8 is a simplified block diagram of an exemplary embodiment of transporting A3/A8 authentication parameters inside AKA parameters according to the present disclosure.

In the preferred embodiment, A3/A8 parameters are contained within AKA authentication parameters that are passed in the IMS core network. Because the A3/A8 parameters are shorter than the AKA authentication, this can be easily accomplished. For example, the A3/A8 parameters can be accommodated in the manner as illustrated in FIG. 8:

The GSM SRES parameter 80 is 4 bytes and the UMTS XRES parameter 81 is 8 bytes. Therefore, an XRES parameter 81 can include the SRES parameter 80 and 4 additional bytes of filler bits 82, which may be set to zeroes, for example.

The GSM Kc parameter 84 is 8 bytes and the UMTS CK parameter 85 is 16 bytes. Therefore, a CK parameter 85 can be constructed to contain the Kc parameter 84 (8 bytes) and 8 additional bytes of filler bits 86, which may be set to zeroes, for example.

There is no GSM integrity key and the UMTS IK parameter 88 is 16 bytes. Therefore, an IK parameter 88 can contain 16 bytes of zeroes 89, for example.

There is no GSM authentication token parameter (AUTN) 90 and the UMTS AUTN is 16 bytes, so an AUTN parameter 90 can contain 16 bytes of zeroes 91, for example.

Because the parameter sizes match what is expected with AKA authentication information, the S-CSCF 82 is unaware that A3 and A8 parameters are actually being passed. All of the S-CSCF's current functionality and checks will still function properly. Only the IMS HSS FE 78 and the ICS GW 70 are aware what authentication parameters are really being used for authentication.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A method of subscriber identity authentication in an internet Protocol Multimedia Subsystem (IMS) core network, comprising:
    receiving an access request from a User Equipment (UE) having a Subscriber Identity Module (SIM);
    requesting Authentication and Key Agreement (AKA) authentication vectors from a Home Subscriber Server (HSS);
    retrieving Global System for Mobile Communications (GSM) A3 (authentication algorithm)/A8 (confidentiality key creation) authentication vectors (A3/A8 authentication vectors) including an A3/A8 authentication response from a Home Location Register (HLR);
    encoding the A3/A8 authentication vectors by adding at least one filler bit of a known value or adding at least one 0 bit to achieve required bit lengths of AKA authentication vectors and transmitting the AKA authentication vectors to a node in the IMS core network;
    receiving an authentication challenge from the node in the IMS core network with encoded A3/A8 authentication vectors;
    detecting A3/A8 authentication vectors and issuing an A3/A8 authentication challenge to the UE;
    receiving an A3/A8 authentication response from the UE;
    encoding the A3/A8 authentication response into an AKA authentication response; and
    transmitting the AKA authentication response to the node in the IMS core network for comparing the A3/A8 authentication response from the HLR with the A3/A8 authentication response from the UE.

2. The method of claim 1, wherein transmitting the AKA authentication vectors to a node in the IMS core network comprises transmitting the AKA authentication vectors to a Serving Call Session Control Function (S-CSCF).

3. The method of claim 1, wherein encoding the A3/A8 authentication vectors comprises embedding the A3/A8 authentication vectors within AKA authentication vectors.

4. The method of claim 1, wherein retrieving A3/A8 authentication vectors comprises retrieving a Signed Response (SRES) and a Confidentiality Key (KC).

5. The method of claim 1, wherein encoding the A3/A8 authentication vectors as AKA authentication vectors comprises:
    embedding a Signed Response (SRES) parameter in an Expected Response (XRES) parameter of the AKA authentication vector; and
    embedding a Confidentiality Key (KC) parameter in an Confidentiality Key (CK) parameter of the AKA authentication vector.

6. The method of claim 5, further comprising:
    composing an Integrity Key (IK) parameter of the AKA authentication vector by adding filler bits of a known value to achieve its required bit length; and
    composing an Authentication Token (AUTN) parameter of the AKA authentication vector by adding filler bits of a known value to achieve its required bit length.

7. A telecommunication network comprising:
    a gateway node configured to receive an access request from a mobile device having a Subscriber Identity Module (SIM);
    an interface node configured to retrieve A3 (authentication algorithm)/A8 (confidentiality key creation) authentication vectors (A3/A8 authentication vectors) including an A3/A8 authentication response from a Home Location Register (HLR), and further configured to encode the A3/A8 authentication vectors by adding at least one filler bit of a known value or adding at least one 0 bit to achieve required bit lengths of Authentication and Key Agreement (AKA) authentication vectors and send the AKA authentication parameters to an internet Protocol Multimedia Subsystem (IMS) network node;
    the gateway node configured to receive an authentication challenge from the IMS network node with encoded A3/A8 authentication vectors, and further configured to detect the A3/A8 authentication vectors and issue an A3/A8 authentication challenge to the mobile device; and
    the gateway node configured to receive an A3/A8 authentication response from the mobile device, and further to encode the A3/A8 authentication response into an AKA authentication response and sending it to the IMS network node for comparison.

8. The telecommunication network of claim 7, wherein the gateway node comprises an IMS Centralized Services Gateway (ICS GW).

9. The telecommunication network of claim 7, wherein the interface node comprises a Home Subscriber Server Front End (HSS FE).

10. The telecommunication network of claim 7, wherein the IMS network node comprises an S-CSCF.

11. The telecommunication network of claim 7, wherein the interface node is configured to embed A3/A8 authentication parameters in AKA authentication parameters and send the AKA authentication parameters to the IMS network node.

12. A telecommunication network comprising:
    an internet Protocol Multimedia Subsystem (IMS) Centralized Services Gateway (ICS GW) configured to receive an access request from a User Equipment (UE);

a Home Subscriber Server Front End (HSS FE) configured to retrieve A3 (authentication algorithm)/A8 (confidentiality key creation) authentication vectors (A3/A8 authentication vectors) including an A3/A8 authentication response from a Home Location Register (HLR), and further configured to encode the A3/A8 authentication vectors by adding at least one filler bit of a known value or adding at least one 0 bit to achieve required bit lengths of Authentication and Key Agreement (AKA) authentication vectors and send the AKA authentication parameters to a Serving Call Session Control Function (S-CSCF);

the ICS GW configured to receive an authentication challenge from the S-CSCF with encoded A3/A8 authentication vectors, and further configured to detect the A3/A8 authentication vectors and issue an A3/A8 authentication challenge to the UE; and the ICS GW configured to receive an A3/A8 authentication response from the UE, and further to encode the A3/A8 authentication response into an AKA authentication response and sending it to the S-CSCF for comparison.

\* \* \* \* \*